Jan. 7, 1964  M. P. WAX  3,116,961
RECORDER HAVING MULTI-WAY SWITCH SYSTEM
Filed May 23, 1958  2 Sheets-Sheet 1

Inventor
MARTIN PHILIP WAX
By John F. Lehrs
Attorney

Jan. 7, 1964 M. P. WAX 3,116,961
RECORDER HAVING MULTI-WAY SWITCH SYSTEM
Filed May 23, 1958 2 Sheets-Sheet 2

INVENTOR
MARTIN PHILIP WAX
BY
John F. Lehrs
ATTORNEY

United States Patent Office 3,116,961
Patented Jan. 7, 1964

3,116,961
RECORDER HAVING MULTI-WAY
SWITCH SYSTEM
Martin Philip Wax, Purley Way, Croydon, England, assignor to Bailey Meter Company, Cleveland, Ohio, a corporation of Delaware
Filed May 23, 1958, Ser. No. 737,230
8 Claims. (Cl. 346—14)

The present invention relates to improvements in or relating to means for providing a visual indication or record and multiway switches suitable for use therein.

Although early electronic computers of the digital type operated on a binary system, there are many advantages if the decimal system is adopted, one of the main advantages being the avoidance of the need to transform a number which is in binary form to a number which is in decimal form whenever an operator of the computer requires to read off an answer to a part or the whole of the calculation being effected. In some computers the binary system is utilized for the calculation together with a decimal system to give intermediate and final answers in the calculation in decimal form.

Where a decimal form of presentation of such answers is utilized, each decade of the answer may include a set of ten conductors representing the digits 0 to 9, one of which will be energized to indicate the value of the term in that decade of the answer. For example, a gas filled glow discharge tube of the Dekatron Selector type may be utilized, the ten conductors then being either the ten cathode connections or parts of resistive networks respectively associated with those cathode connections.

An object of the invention is the provision of means suitable for providing a visual indication or record of the electrical state of each of a group of electrical conductors; and, more particularly, the provision of an improved multi-way switch suitable for use in such means.

The invention includes means for providing a visual indication or record of the electrical state of each of a group of electrical conductors, comprising a rotatable member bearing a circular series of spaced indicia respectively representing the individual electrical conductors and arranged upon rotation of the member to pass one at a time past an information extracting station, information extracting means located adjacent the extracting station and adapted to be capable upon activation to extract a copy of the indicium instantaneously opposite the means, and a plurality of activating means severally responsive to the electrical states of the separate conductors and to the instantaneous orientation of the rotatable member about its axis of rotation to activate the extracting means upon the simultaneous occurrence of both a predetermined electrical state at the associated conductor and the positioning of the corresponding indicium at the extracting position.

The invention also includes a multi-way switch suitable for the successive energization of a multiplicity of circuits comprising a light source and a rotatable member adapted in combination to produce a moving beam of light, a series of photo-electric light sensitive means arranged to be swept in turn by the moving beam, and separate switching circuits associated respectively with the light sensitive means and each adapted to be operated by illumination of the associated light sensitive means by the beam of light.

The invention will now be described, by way of example, with reference to the accompanying diagrammatic drawings, in which.

The electronic computer with which the printing device is associated provides its output or answer in the form of a decimal number, and for the purpose of describing the present invention it has been assumed that the decimal number will have but 3 digits or decades. In actual practice, an electronic computer will have many more than three decades in the answer, but in order to provide for those extra decades it is necessary that merely certain specified parts of the device shown and described shall be repeated.

Associated with each decade of the output or answer is an electronic counting tube known in the art as a dekatron selector glow discharge tube. Thus in the apparatus illustrated in FIGURE 3 three such tubes, designated X, Y, and Z, are shown, and the internal electrode arrangement in the tube X is shown in order that the purpose and function of the apparatus of the present invention may be seen.

Figure 3:
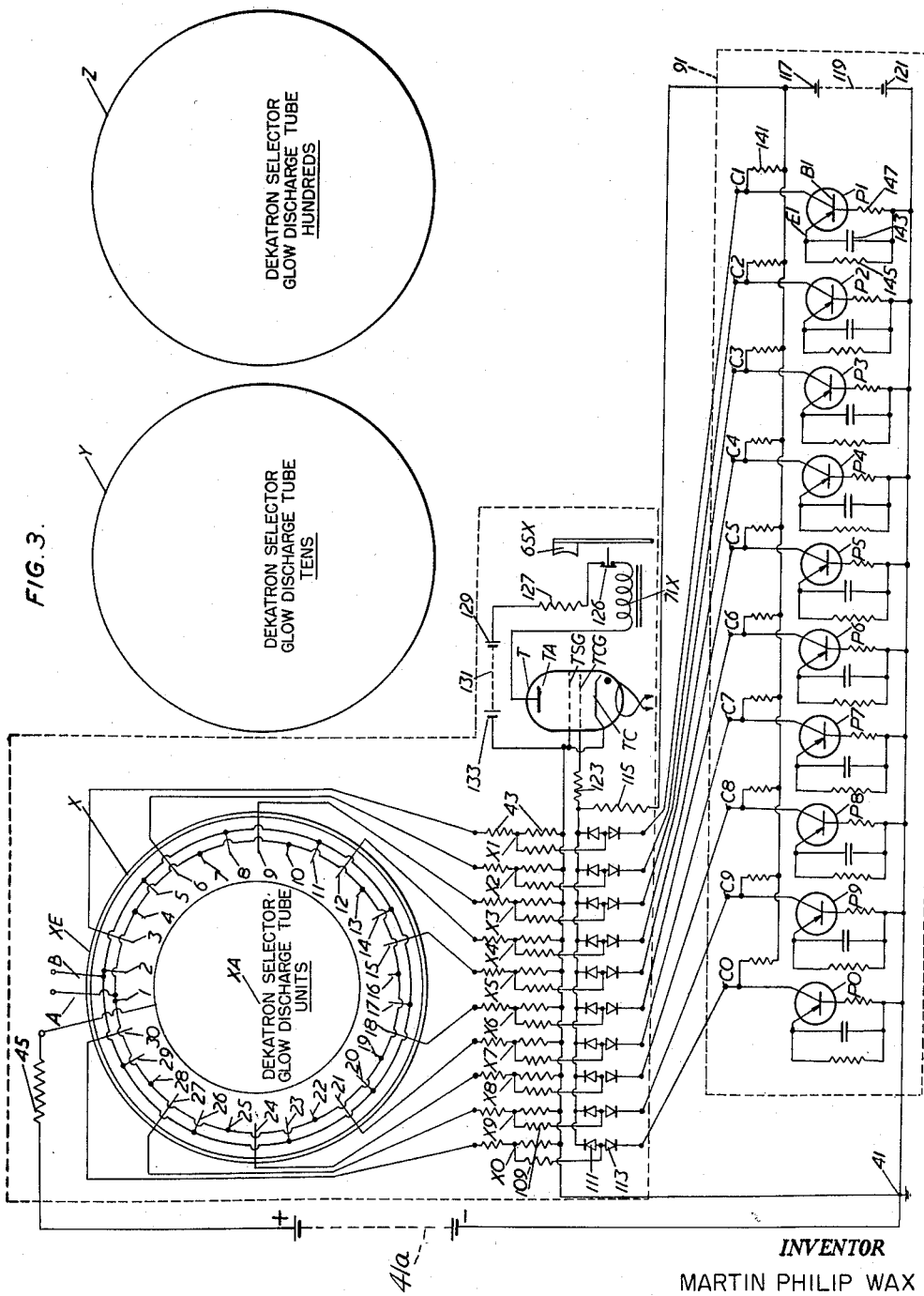
FIGURE 3 is a circuit diagram of control means for the printing device shown in FIGURE 1.

Thus the dekatron selector tube X comprises a tubular glass envelope XE filled with a suitable inert gas under a relatively low pressure with a disc-like anode XA about the periphery of which is arranged an evenly spaced system of thirty pin-like electrodes, which have been numbered off in FIGURE 3 in consecutive order from 1 to 30. Pins 3, 6, 9, 12, 15, 18, 21, 24, 27 and 30 are respectively connected to external leads of the tube and are respectively designated "cathodes 1, 2, 3, 4, 5, 6, 7, 8, 9, and 0." Pins 1, 4, 7, 10, 13, 16, 19, 22, 25 and 28 are connected together inside the tube envelope and to a lead outside the envelope and are designated collectively as "guide A." Pins 2, 5, 8, 11, 14, 17, 20, 23, 26 and 29 are connected together inside the tube envelope and to a lead outside the envelope and are designated collectively as "guide B."

Each cathode is connected to the negative pole 41 of a direct current source 41a having an E.M.F. of 400 volts through its own particular load resistance 43 of 66,000 ohms, and the anode XA is connected through resistance 45 of 1,000,000 ohms to the positive pole of the current source. The function of the high anode resistance 45 is to limit the current which can flow from the source through the cathode resistors 43 and the tube to such a low value that the glow discharge in the tube cannot involve more than one of the cathode pins at any one time.

Operating means for the dekatron comprise means for applying a negative pulse to guide A, that is to say a pulse more negative than the potential of the cathode pin which is instantaneously conducting and which may conveniently be derived directly from the negative pole of the current source, and a similar negative pulse to guide B. These operating means are so arranged that a negative pulse may be applied to guide A, a negative pulse then being applied to guide B, the negative pulse on guide A then being cancelled, and the negative pulse on guide B then being cancelled; or alternatively, when desired, a negative pulse may be applied to guide B, a negative pulse may be applied to guide A, the negative pulse on guide B is then cancelled, and the negative pulse on guide A is then cancelled.

In use, the flow of current through one of the cathode resistors 43 produces a voltage drop across that resistor which indicates that cathode is conducting. If, for example, cathode 5 (pin 15) is conducting, and a negative pulse is applied to guide A, the glow discharge is shared between cathode 5 (pin 15) and the adjacent pin (pin 16) of guide A, which from the above description will be seen to lie on the same side of cathode 5 as cathode 6. Upon a negative pulse being added to guide B, the glow discharge becomes shared between the adjacent pin (pin 17) of guide B and the conducting pin (pin 16) of guide A, the discharge from cathode 5 (pin 15) becoming extinguished. As the negative pulse is removed from guide A the discharge from the conducting pin (pin 16) of guide A is extinguished and a glow discharge from cathode 6 (pin 18) is established. When the negative pulse from guide B is removed, the glow discharge from its conducting pin (pin 17) is extinguished and the only glow discharge is then from cathode 6 (pin 18). Had the sequence of application of the negative pulses been reversed, i.e., if guide B had been pulsed before guide A, the glow discharge would have transferred from cathode 5 to cathode 4.

It will be seen that with the above arrangement of a dekatron selector tube, the ten cathodes may be energized one at a time, the number of the cathode energized being changed stepwise one cathode at a time. Reference may be made to pages 335–339 of, "Pulse and Digital Circuits," by Millman and Taub, published by McGraw-Hill, in 1956, for a more complete description of the operation of the dekatron glow discharge tube.

In known manner, a transfer arrangement is incorporated in the circuits of the dekatron selector tubes so that tube X may indicate units of 100 basic units, tube Y may indicate units of 10 basic units and tube Z may indicate basic units, this arrangement causing a step of one in the indication of the tube Y for every ten unidirectional steps in the operation of tube Z, in the appropriate direction, and similarly a step of one in the indication of tube X for every ten unidirectional steps in the operation of tube Y.

The indication of the tubes X, Y and Z may be visually examined, the end of each tube being provided with windows severally opposite each of the ten cathodes and the cathode which is conducting being readily observed, but for many purposes an output voltage is required, and a convenient point for extracting information as to which cathode is conducting in each tube is at the mid point of each of the cathode resistances 43. In the case of the tube X, the mid-points of the ten cathode resistances 43 are taken as the ten conductors to which the printing devices of the present invention are sensitive, and these ten mid-points are referred to hereinafter as X1, X2, X3, X4, X5, X6, X7, X8, 9X and X0, it being understood that these are respectively associated with the cathodes 1 to 0 of the tube X.

The problem of the present apparatus is to obtain a printed record of an answer presented by the electronic computer, in the form of a number of voltages, one for each decade, in each decade there being ten conductors one of which is at a voltage different from that of the others. Thus for the decade of tube X, one of the conductors or points X1 to X0, the point associated with the cathode which is conducting, will be at a higher (more positive) voltage than the other points.

Figure 1:
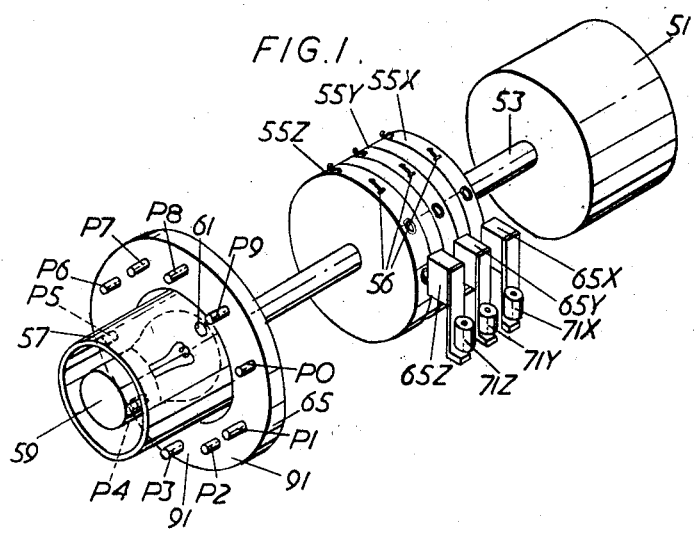
FIGURE 1 is a representation of a three-decade decimal number printing device associated with an electronic computer, the roll of paper on which the printing is done being omitted.

In the apparatus shown in FIGURE 1 a small electric motor 51 has an output shaft 53 on which are fixed three print drums 55X, 55Y and 55Z each provided about its periphery with spaced raised type negatives for the numerals 0 to 9 and, at the end remote from the motor, a hollow drum 57 into which extends a fixed electric lamp 59 and which is formed with a small radial aperture 61 provided with a fixed lens. This shaft 53 is provided with suitable bearings, which are not detailed in the drawing. A metal ring 65 encircles the drum 57 and carries a circle of ten equally spaced photo-transistors of the type OCP 71, indicated by P1, P2, P3, P4, P5, P6, P7, P8, P9 and P0, arranged to receive, one at a time, light emitted by the lamp 59 and shining out through the aperture 61, as the drum is rotated by the motor.

Figure 2:
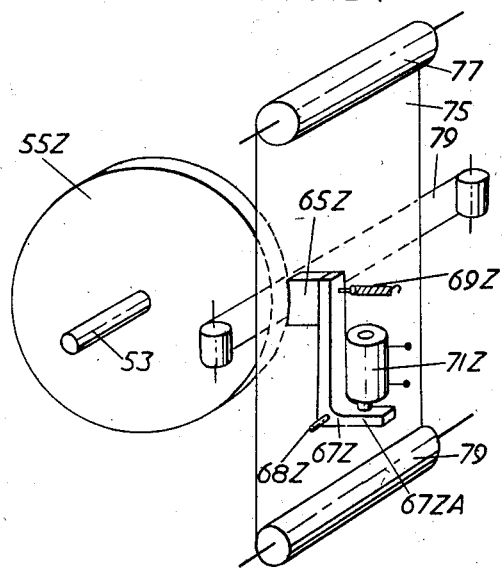
FIGURE 2 is a representation of one of three print hammers shown in FIGURE 1 and of the roll of paper omitted from FIGURE 1.

Opposite the print drum 55Z is disposed a hard rubber print hammer 65Z mounted on an L-shaped lever 67Z (see FIGURE 2) pivoted on a spindle 68Z which extends parallel to the shaft 53 and biased by a spring 69Z away from the print drum 55Z against an adjustable stop (not detailed). An electromagnet 71Z is arranged to act upon the foot 67ZA of the lever 67Z and, when sufficiently energized, to overcome the spring 69Z and drive the print hammer 65Z forcibly towards the print drum 55Z. Similar print hammers, 65X and 65Y are similarly disposed opposite the print drums 55X and 55Y and are provided with actuating electromagnets 71X, 71Y. Disposed between the print hammers and the print drums is an intermediate part of a length 75 of paper wound at its ends upon upper and lower rollers 77, 79 the axes of which are parallel to the shaft 53, the upper roller 77 having a suitable mechanism associated with it for driving the roller in steps so as to wind the length of paper 75 step by step from the lower to the upper roller. A typewriter ribbon 79 is disposed between the roll of paper 75 and the print drums 55X, 55Y and 55Z.

The print drum 55X, print hammer 65X and its operating electromagnet 71X are all associated with the decade of the answer incorporating the dekatron tube X; print drum 55Y, print hammer 65Y and electromagnet 71Y are associated with the decade incorporating the dekatron tube Y; and print drum 55Z, print hammer 65Z and electromagnet 71Z are associated with the decade incorporating dekatron tube Z.

All three decades are served by a single photo-transistor switch 91 formed by the lamp 59, the aperture 61 in the motor driven drum 57, the ten photo-transistors P0 to P9 and their associated electrical network.

As shown in FIGURE 3, the center tap of each of the cathode resistors 43 of the dekatron tube X is connected through a resistance 109 of 1,000,000 ohms to the negative poles of a pair of suitable metal rectifiers 111, 113. The positive poles of all ten rectifiers 111 are connected together and through a resistance 115 of 1,000,000 ohms to the negative pole 117 of a 20 volt battery 119 which has its positive pole 121 connected to the negative pole 41 of the direct current source 41a for the dekatron tube X; and the positive poles of these ten rectifiers 111 are also connected through a resistance 123 of 100,000 ohms to the control grid TCG of a screened gridthyratron T. The anode TA of this thyratron is connected through the coil of electromagnet 71X of print hammer 65X, a normally closed switch 126 opened by the print hammer as it moves towards the print drum, and a current limiting resistance 127 to the positive pole 129 of a battery 131 having its negative pole 133 connected to the screen grid TSG, to the cathode TC, and to the negative pole 41 of the dekatron current source.

Each dekatron tube X, Y, Z, has associated with it a system of cathode resistors, rectifiers, thyratron and print hammer as described above with reference to the tube X.

The positive poles of the ten rectifiers 113 are severally connected to the collector electrodes C1, C2, C3, C4, C5, C6, C7, C8, C9, C0 of the ten photo-transistors P1 to P0. Associated with each of these ten photo-transistors is a resistive-capacitive network, as shown in FIGURE 3, and as these networks are similar, only that associated with photo-transistor P1 will be described in detail.

In this network, the collector electrode C1 is connected through a resistance 141 of 4,700 ohms to the negative pole 117 of the battery 119; the emitter electrode E1 is connected through a parallel combination of a capacitance 143 of 25 micro-farads and a resistance 145 of 12,000 ohms to the positive pole 121 of battery 119; and the base electrode B1 is connected to the positive pole 121 of battery 119 through a resistance 147 of 12,000 ohms.

In use of the photo-transistor switch 91 and the associated thyratrons and print hammers, the operation of the dekatron tubes X, Y, and Z is for all practical purposes unaffected by the conditions in these associated items. Thus the dekatron tubes operate in their usual manner, as has been described, and it is found that the center tap of the cathode resistance 43 associated with a cathode which is conducting is approximately 25 volts more positive than the battery pole 121. Due to the inclusion of the photo-transistor switch 91 with its battery 119 the voltage conditions at the center tap of the dekatron cathode resistance which is not conducting are modified. Since the dekatron is a current-limited device this change of voltage does not affect the dekatron appreciably.

As the motor 51 rotates the print drums 55X, 55Y, and 55Z and the drum 57 at a speed of about 150 revolutions per minute, the beam of light passing from the lamp 59 through the hole 61 falls in turn upon the photo-transistors P1 to P0. The direction of rotation of the motor output shaft 53 is immaterial to an understanding of the invention, but in practice will determine the sense of a "lead" which will be described below.

As shown in FIGURE 1, the indicia for printing numerals 9 on the print drums 55X, 55Y and 55Z are at information extracting stations opposite the print hammers 65X, 65Y and 65Z at the exact instant when the photo-transistor P9 is fully illuminated by the beam of light from the lamp 59. Furthermore, as each indicium passes its associated print hammer, the correspondingly numbered photo-transistor is fully illuminated by that beam of light.

The function of the photo-transistor switch 91 is to cause the electromagnet 71X to be energized, thereby causing the print hammer 65X to be driven towards the print drum 55X, when the indicium on the drum 55X corresponding to the conductor of that decade which is instantaneously energized is opposite the print hammer at the information extracting station. Switch 91 also controls the energization of the electromagnets associated with other print hammers in a similar manner.

Since the cathode TC of the thyratron T is connected to the positive pole 121 of the battery 119, it has the potential of that positive pole, and this potential is referred to as earth potential in the following description; other potentials which are quoted are with reference to that earth potential.

If a dekatron cathode is not conducting, then there is no cathode current and the only source of E.M.F. affecting the associated photo-transistor in the photo-transistor switch 91 is the battery 119. Current flows from the positive pole 121 of that battery through one 33,000 ohms section of the cathode resistance 43 and through the 1,000,000 ohms resistance 109 to the common point of the two rectifiers 111, 113. If the photo-transistor is non-illuminated, and therefore non-conductive, this current divides between the 1,000,000 ohms resistance 115 and the 4,700 ohms resistance 141. The 4,700 ohms resistance 141 thus serves to by-pass the 1,000,000 ohms resistance 115 so that the control grid TCG of the thyratron T is at a potential approaching −20 volts. Under these circumstances the thyratron will not conduct and the electromagnet 71X will not be energized. By means of the 12,000 ohms resistance 145 the 25 micro-farad capacitance 143 attains an uncharged state so that the emitter electrode E1 and base electrode B1 are at substantially the same potential, earth or zero potential.

Upon the photo-transistor P1 being strongly illuminated, the associated dekatron cathode remaining non-conducting, a flow of electrons takes place at the emitter electrode E1 and a relatively large current flows from the collector electrode C1. This large current flow through the base resistance 147 of 12,000 ohms and the resistance 141 of 4,700 ohms raises the potential of the collector C1 from −20 volts to about −15 volts. Due to this increase in the collector electrode potential, the rectifier 113 is back-biased and so becomes non-conducting; under these circumstances the 1,000,000 ohms resistances 109, 115 act as a potential divider and the control grid TCG of the thyratron T assumes a new potential of about −10 volts, which is still sufficiently negative with respect to its cathode to prevent the thyratron from striking and commencing to conduct.

It will be understood that the photo-transistor P1 could not maintain this large collector current for more than a short period, since the potential of the emitter electrode E1 falls (becomes more negative) as the condenser 143 discharges. However, the illumination of the photo-transistor P1 by the lamp 59 lasts for such a short time that the current pulse does not die away, but is terminated by the darkening of the photo-transistor.

When the associated dekatron cathode is conducting, the center tap X1 will assume a potential of about +25 volts, this potential being as before a potential relative to earth as defined by battery pole 121. Since resistance 109 has a value of 1,000,000 ohms, and the E.M.F. of battery 119 is only 20 volts, under no circumstances can the battery 119 drive more than 20 microamperes through the resistance 109 and thus the cathode resistance 43. This current is so small compared with the normal current of 800 microamperes through the resistance 43 when the associated cathode is conducting, that changes in the current through the resistance 109 will have only a negligible effect upon the voltage of the center tap X1.

It follows that the potential of the control grid TCG of the thyratron T depends upon the voltage divider effect of the resistances 109, 115 and 141. Thus when the photo-transistor, P1 is darkened so that it is non-conducting the 4,700 ohms resistance 141 acts as a low resistance shunt for the 1,000,000 ohms resistance 115 and the two resistances 109 of 1,000,000 ohms and 141 of 4,700 ohms act as a potential divider subject to end potentials of +25 volts and −20 volts to produce a potential on the control grid of about −19 volts, which prevents the thyratron from becoming conductive.

If, when the associated dekatron cathode is conducting, the photo-transistor P1 is illuminated, then as described above a relatively large current passes from the collector electrode C1 and that electrode assumes a potential of about 15 volts. The rectifier 113 is therefore, upon illumination of the photo-transistor P1, initially back biased, so preventing current flow from resistance 109 into the resistance 141 and preventing the resistance 141 from acting as a low resistance shunt for the resistance 115. Resistances 109 and 115 then act as a potential divider subject at its ends to potentials of +25 volts and −20 volts and produce a potential on the control grid TCG of the thyratron T of about +2 volts, which is sufficiently high for the thyratron T to strike. As the thyratron control grid potential rises in this manner the rectifier 113 is no longer back biased, but its resistance is sufficient for it to be unable to prevent the establishment of a positive pulse upon the control grid of the thyratron. Once the thyratron has struck, the subsequent voltage upon its control grid is unimportant, but the resistance 123 by limiting grid current protects the thyratron from mechanical damage.

When the thyratron T strikes in the manner described above, a current passes, in the conventional sense, from the positive pole 129 of battery 131 through the electromagnet coil 71X, so energizing that electromagnet and causing the print hammer 65X to be moved smartly towards the print drum 55X. This movement of the print hammer 65X opens the switch 126, so quenching the thyratron T and de-energizing the electromagnet 71X to permit the spring associated with the lever 67X to restore the print hammer to its original position spaced from the print drum. It will be appreciated that the inertia of the print hammer renders the period during which switch 126 is open comparatively long, so that the positive pulse on the control grid is terminated before the switch is reclosed. Once the illumination of the photo-transistor P1 ceases, a new system of potentials is established rapidly which cause the thyratron, once quenched, to remain non-conductive as described above.

Forward motion of the print hammer forces the paper 75 towards the print drum 55Z, and the typewriter ribbon 79 trapped between the paper and the raised type on the type drum imprints the digit 1 upon the paper. The movement of the print hammer is so rapid in terms of the linear speed of the surface of the print drum 55X past the information extracting station that serious blurring of the printed indicium is avoided.

It will be appreciated that if the print drums 55X, 55Y and 55Z were rotating at high speeds and if there were an appreciable delay between the striking of the thyratron tube and the striking of the associated print hammer against its print drum, the indicium would have passed the information extracting station before the requisite printing operation was completed. In the apparatus described the speed of the print drums is kept relatively low, the actual movement of the print hammer is made rapid, and it is a simple matter to orient the ring 65 so that each photo-transistor is illuminated a short time before its associated indicium is at the information extracting station. The amount of the "lead" necessary must be determined by experiment for each particular installation.

The particular apparatus described operates with a rotational speed for the print drums of about 150 revolutions per minute, and each drum is of one inch diameter. For drums operating at high surface speeds it will sometimes be found necessary to provide some trigger device for rendering the action of the print hammer more rapid so as to avoid blurring of the printed image on the paper. Thus the current from the thyratron may be used to energize a solenoid the plunger of which is effective to compress a spring, the plunger being arranged, when it has almost reached the end of its travel, to operate a latch which releases the spring suddenly. The hammer in such an arrangement will be propelled by the spring, and the latch will be reset upon the solenoid being de-energized. In such an arrangement the forward movement of the hammer takes only a very short time compared with the length of the operating pulse from the thyratron, so serious blurring of the printed indicium is avoided.

Protective means (not detailed) are arranged to avoid overprinting of the indica on the paper upon a change of state of the conductors. These means may consist of a relay controlling a switch in the lead from positive pole 129 of the battery 131, the relay being energized and the switch closed after a "read-off" switch is manually closed upon the occurrence of a pulse on C1 of photo-transistor P1 and being automatically de-energized so that the switch reopens upon the occurrence of a second pulse on C1. The time lag of the system is sufficient to prevent the indicium associated with P1 being printed twice.

An alternative form for the protective means is to provide eleven photo-transistors instead of the ten described above, the ten digits 0 to 9 being oriented about the print drums in a manner similar to that of ten of these photo-transistors which are connected up and control the associated print hammers as described above. The eleventh photo-transistor is quite separate from the other ten and is used to provide a trigger pulse which controls the effectiveness of the photo-transistor switch 91. In such an arrangement, upon a "read-off" switch being manually closed the print-off device becomes effective upon a first pulse from this eleventh photo-transistor and is rendered ineffective upon receiving a second pulse from this photo-transistor, the pulses operating a switch which suitably may be arranged, when closed, to short circuit the resistance 115 associated with the thyratron control grid TCG. Such a switch would need to control small currents only and in that location, when closed would maintain the thyratron strongly biased against conduction, so that the first pulse from the eleventh photo-transistor would be used to open this switch and the second pulse to close it.

After an answer is printed off in the manner described, the paper 75 is moved upwards an appropriate distance before a further answer is printed off, preferably automatically by a circuit energized by the protective means upon the completion of the print-off of an answer.

If desired the typewriter ribbon 79 can be replaced with an inking roller arranged to ink the raised indicia or type on the print drums as these drums rotate.

Where the information as to the electrical state of the group of conductors is to be presented in form of a visual indication as distinct from a visual record, each print drum is replaced with an opaque drum formed at spaced intervals about its periphery with transparent portions each bearing an image of the appropriate digit. The print hammer for that drum is replaced with a xenon flash lamp arranged to direct a beam of light of short duration through the transparency from inside the drum. The drums bearing the transparencies are spaced apart to permit support of the lamps by members extending between adjacent drums. The photo-transistor switch 91 is utilized as shown in FIGURE 3 but the thyratron T is replaced by a trigger circuit giving the necessary output to operate the xenon flash lamp. The speed of the drums in this arrangement is about 1,000 revolutions per minute. A ground glass screen is arranged between the drums and the viewer in order to mask the movement of the drum surfaces and so improve the illusion of persistence.

Where such an arrangement is used, as the indicium corresponding to the conductor which is in the energized state passes the information extracting station the light source will be activated by the activating means to give a short pulse of light, and this beam of light will pass through the transparency and produce an illuminated image of the indicium on the ground glass screen for observation by a viewer. Should the electrical state of the conductors change, the illuminated image on the ground glass screen will change to that corresponding to the conductor newly energized, and thus a substantially instantaneous and apparently continuous indication of the state of the conductors will appear on the ground glass screen.

Alternatively, the indica on each drum may be in the form of printed numerals on an opaque background arranged for frontal illumination by a xenon flash lamp and direct viewing by a viewer.

What I claim is:

1. Means for providing a visual record of the electrical state of each of a group of electrical conductors, comprising in combination, a continuously rotatable member bearing a circular series of spaced indicia respectively representing the individual electrical conductors and arranged upon rotation of the member to continuously pass one at a time past an information extracting means capable upon activation to extract a copy of the indicium instantaneously opposite the means, a plurality of activating means each including means responsive to the electrical states of the separate conductors and a photoelectric light sensitive means fixed relative to the information extracting station and light beam means associated with the rotatable member, the light beam means and the light sensitive means being so arranged that the state of illumination of the light sensitive means by the light beam means is considerably different when the indicium associated with that activating means is at an appropriate position relative to the information extracting station than it is at all other times to activate the extracting means upon the simultaneous occurrence of both a predetermined electrical state at the associated conductor and the positioning of the corresponding indica at the extracting position.

2. Means for providing a visual record as claimed in claim 1, wherein the light beam means is arranged to illuminate the light sensitive means strongly only when the associated indicium is at the appropriate position.

3. Means for providing a visual record as claimed in claim 1 wherein a single light beam is arranged to serve as the light beam means associated with a plurality of the light sensitive means.

4. Means for providing a visual record as claimed in claim 1 wherein the light sensitive means is a photo-transistor.

5. Means for providing a visual record as claimed in claim 1 wherein the light beam means associated with the rotatable member is adapted to produce a beam of light which moves in step with the rotatable member, and the activating means includes a series of photo-electric light sensitive means arranged to be swept in turn by the beam as it moves in step with the rotatable member, a light sensitive means being provided for each indicium and serving as part of the section of the activating means associated with that indicium which is responsive to the instantaneous orientation of the rotatable member.

6. Means for providing a visual record as claimed in claim 1 wherein each conductor of the group of electrical conductors is associated with a separate cathode connection of a dekatron selector glow discharge tube.

7. Means for providing a visual record as claimed in claim 1 wherein the activating means include an electrical network and a trigger circuit arranged, upon receipt of an appropriate electrical signal from the network, to provide an electrical pulse to activate the information extracting means, the electrical network has a first input terminal connected to the conductor and a second input terminal connected to the light sensitive means and is sensitive to the simultaneous occurrence of a selected electrical state of the conductor and a selected change of illumination of the light sensitive means and adapted upon that occurrence to provide the trigger circuit with the said signal.

8. Means for providing a visual record as claimed in claim 7 wherein the light sensitive means is a photo-transistor the collector electrode of which is connected to the second input terminal of the network and the emitter electrode of which is connected to the base electrode through a parallel combination of a capacitance and a resistance, the time constant of the parallel combination being such that when the photo-transistor is strongly illuminated a pulse of current is produced at the collector electrode.

References Cited in the file of this patent

UNITED STATES PATENTS

| | | |
|---|---|---|
| 2,283,804 | Grant et al. | May 19, 1942 |
| 2,348,862 | Sorkin | May 16, 1944 |
| 2,477,821 | Potts | Aug. 2, 1949 |
| 2,784,397 | Branson et al. | Mar. 5, 1957 |
| 2,840,807 | Todd et al. | June 24, 1958 |

FOREIGN PATENTS

| | | |
|---|---|---|
| 374,945 | Great Britain | June 20, 1932 |
| 784,744 | Great Britain | Oct. 16, 1957 |